United States Patent Office 3,314,849
Patented Apr. 18, 1967

3,314,849
ANTHELMINTIC PROCEDURE
Philip C. Hamm, Webster Groves, Mo., assignor to Monsanto Company, St. Louis, Mo., a corporation of Delaware
No Drawing. Filed Jan. 4, 1965, Ser. No. 423,296
6 Claims. (Cl. 167—53)

This invention relates to methods of controlling the populations of parasitic nematodes. More specifically, the invention relates to procedures for freeing animals of infections of parasitic worms.

It is well known that domestic animals can become infected with nematodes and other parasitic animals, which cause weight reduction and otherwise produce undesirable ill health. In many instances, anthelmintic infections may destroy or shorten the lives of domestic animals.

There are many compounds which have the ability to destroy the nematodes by combining with the vital enzymes of the microorganisms. These are not generally useful as anthelmintics because they are frequently toxic to the animal host. To be suitable for the internal treatments of animals the compounds must be toxic to the nematodes without significant toxic effects on the treated animal. This selective toxicity should be such that the parasites are destroyed or their population greatly reduced in number. The preferred practice of this invention involves the incorporation of small amounts of the compounds in normal animal diets.

It has been found that alpha-haloacetamides with long aliphatic chains substituted on the amide nitrogen atoms have been found to be useful in the practice of the invention. These compounds will have the structure:

$$X-CH_2-\overset{O}{\underset{\|}{C}}-\overset{H}{\underset{|}{N}}-CH_2-(CH_2)_n-CH_3$$

wherein $n$ is an integer from five to eighteen, and wherein X is a halogen atom selected from the group consisting of bromine and chlorine. Since it is known that the surface coating of the nematodes contains substantial quantities of fat tissue, it is presumed that the long aliphatic chain produces an oil-soluble effect enabling the toxicants to penetrate the organism and contact the vital organs.

Suitable compounds of the class described generically are:

2-chloro-N-dodecylacetamide
2-bromo-N-heptylacetamide
2-chloro-N-hexadecylacetamide
2-bromo-N-decylacetamide
2-chloro-N-nonylacetamide
2-bromo-N-dodecylacetamide
2-chloro-N-octylacetamide
2-bromo-N-octadecylacetamide
2-chloro-N-tetradecylacetamide
2-bromo-N-tetradecylacetamide
2-chloro-N-octadecylacetamide
2-bromo-N-eicosylacetamide

Example 1

In an in vitro experiment the nematode *Turbatrix aceti* in aqueous suspension was completely controlled at 10 parts per million of 2-bromo-N-dodecylacetamide.

Example 2

The nematode *Strongyloides ratti* was used to infect rats (100 to 116 grams) by injecting subcutaneously a suspension of the filariform larvae, each animal receiving about 500 larvae. Twelve days after infection the rats were fasted for 20 hours and 1000 mg./kg. of 2-bromo-N-dodecylacetamide was administered by oral intubation. The rats were then fasted overnight and the degree of infection was determined by postmortem. The treated animals were substantially cleared of infection whereas the control animals were severely infected.

Example 3

Mice naturally infected with *Aspicularis tetraptera* were used in this experiment. The mice were treated with 1000 mg./kg. of body weight of 2-bromo-N-dodecylacetamide by oral intubation in the form of a solution. After a single dose the mice were fed normally for 24 hours. They were then fasted overnight and by post mortem it was noted that in the treated animals the infestation was arrested.

Example 4

Mice naturally infected with *Syphacea obvelata* were used in this experiment. The mice were treated with 1000 mg./kg. of body weight of 2-bromo-N-dodecylacetamide by oral intubation in the form of a solution. After a single dose the mice were fed normally for 24 hours. They were then fasted overnight and by post mortem it was evident that a large number of the mice were cleared of infection.

Example 5

The aqueous suspension of the nematode *Turbatrix aceti* was treated with 10 parts per million of compounds of the structure $$R-NH-\overset{O}{\underset{\|}{C}}-CH_2X$$

and the following observations were made of the effect of compounds with the substituents:

| R | X | |
|---|---|---|
| Methyl | Cl | Inactive. |
| Pentyl | Cl | Do. |
| Hexyl | Cl | Do. |
| Heptyl | Cl | Do. |
| Nonyl | Cl | Severe inhibition. |
| Dodecyl | Cl | Complete kill. |
| Do | Cl | Do. |
| Do | Br | Do. |
| Do | I | Inactive. |

Although the invention is described above with respect to specific modifications, the details thereof are not limitations of the scope of the invention except to the extent incorporated in the following claims.

The embodiments of the invention in which an exclusive property or privilege is claimed are defined as follows:

1. The method of inhibiting parasitic helminths in animal digestive systems which comprises orally feeding the animal an inhibitory amount of a compound of the formula:

$$X-CH_2-\overset{O}{\underset{\|}{C}}-\overset{H}{\underset{|}{N}}-CH_2-(CH_2)_n-CH_3$$

wherein $n$ is an integer from five to eighteen, and wherein X is a halogen of the group consisting of bromine and chlorine.

2. The method of inhibiting parasitic helminths in animal digestive systems which comprises orally feeding the animal an inhibitory amount of 2-bromo-N-dodecylacetamide.

3. The method of inhibiting parasitic helminths in animal digestive systems which comprises orally feeding the animal an inhibitory amount of 2-chloro-N-dodecylacetamide.

4. The method of inhibiting parasitic helminths in animal digestive systems which comprises orally feeding the animal an inhibitory amount of 2-bromo-N-decyl-acetamide.

5. The method of inhibiting parasitic helminths in animal digestive systems which comprises orally feeding the animal an inhibitory amount of 2-bromo-N-octyl-acetamide.

6. The method of inhibiting parasitic helminths in animal digestive systems which comprises orally feeding the animal an inhibitory amount of 2-bromo-N-octadecyl-acetimide.

References Cited by the Examiner
UNITED STATES PATENTS 3,154,400  10/1964  Hamm _____ 71—2.7

OTHER REFERENCES

J. of Parasitology, February 1949, p. 13.

SAM ROSEN, *Primary Examiner.*

R. BARRESE, *Assistant Examiner.*